United States Patent
Reid et al.

[15] 3,643,570
[45] Feb. 22, 1972

[54] DUAL CAMERA

[72] Inventors: Marvin A. Reid; William R. Swift, both of Placentia, Calif.

[73] Assignee: Coleman Engineering Company, Inc., Santa Ana, Calif.

[22] Filed: Mar. 17, 1969

[21] Appl. No.: 807,718

[52] U.S. Cl. ............................................................. 95/18
[51] Int. Cl. ...................................................... G03b 35/08
[58] Field of Search ............................................... 95/18, 48

[56] References Cited

UNITED STATES PATENTS

| 1,060,748 | 5/1913 | Folmer | 95/- |
| 2,018,891 | 10/1935 | Kean | 95/18 |
| 2,625,864 | 1/1953 | Engelhardt | 95/48 |
| 2,921,509 | 1/1960 | Freund | 95/18 |

*Primary Examiner*—John M. Horan
*Attorney*—Jess M. Roberts

[57] ABSTRACT

To provide an immediate duplicate of an image projected by a beam of light onto a conventional film in a camera, a beam splitter is employed to reflect a portion of the beam to project the same image on "Polaroid" film in the camera.

10 Claims, 12 Drawing Figures

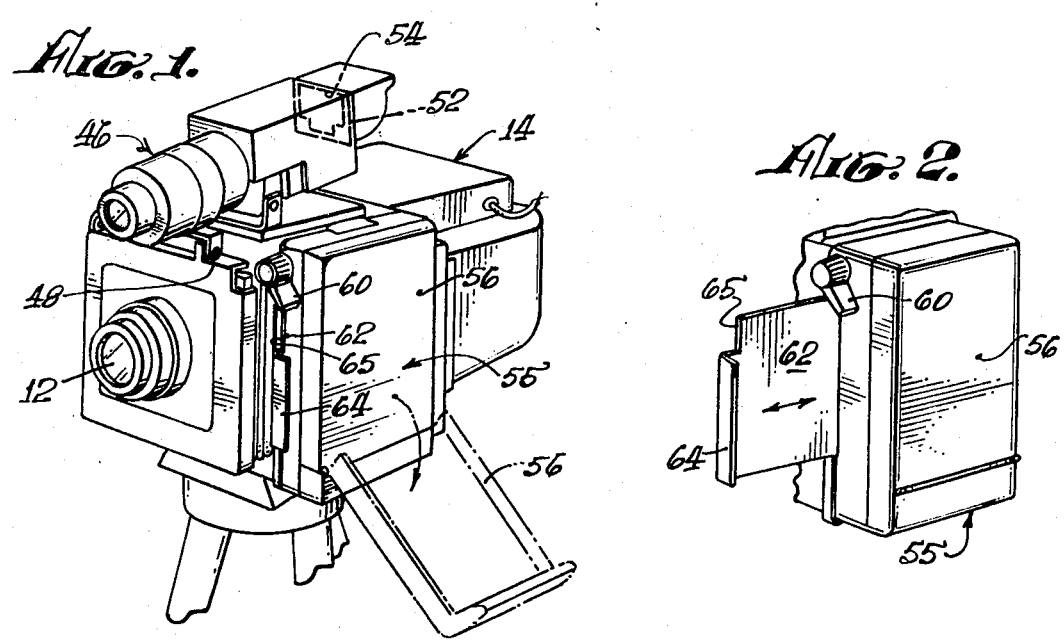
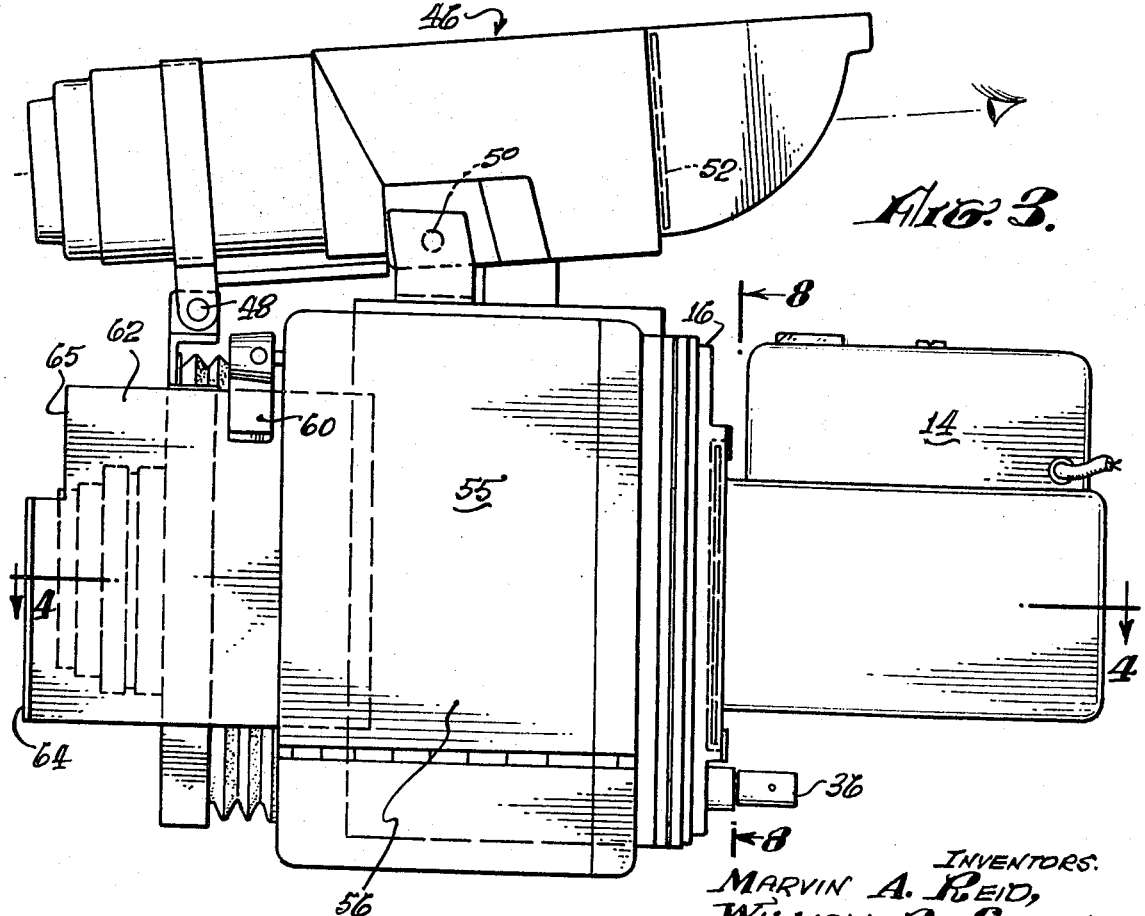

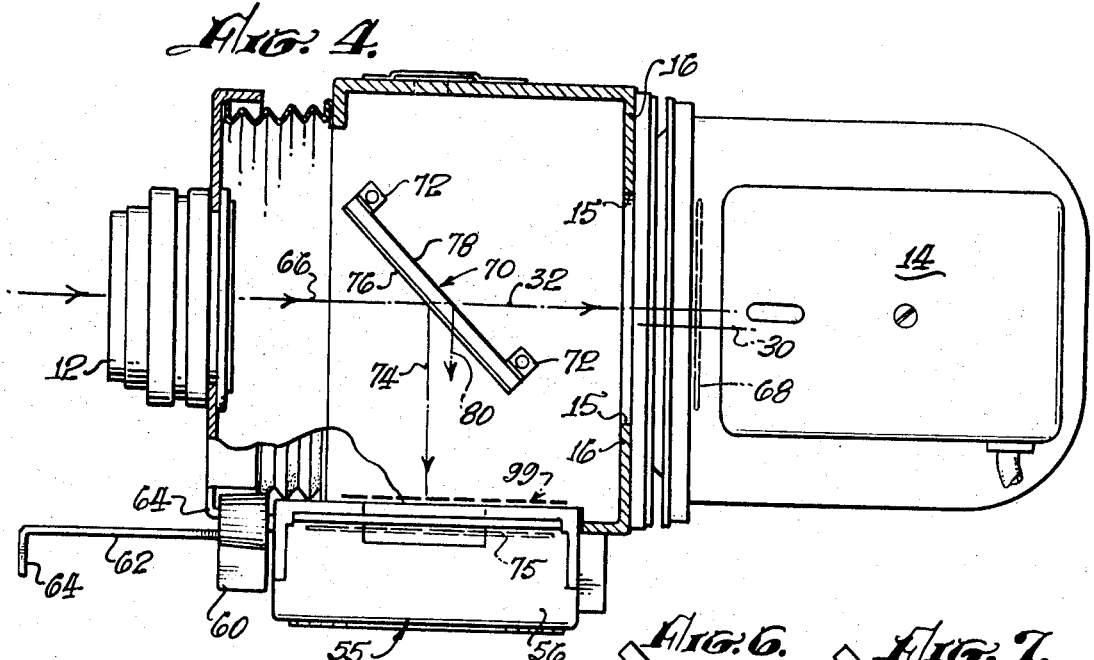
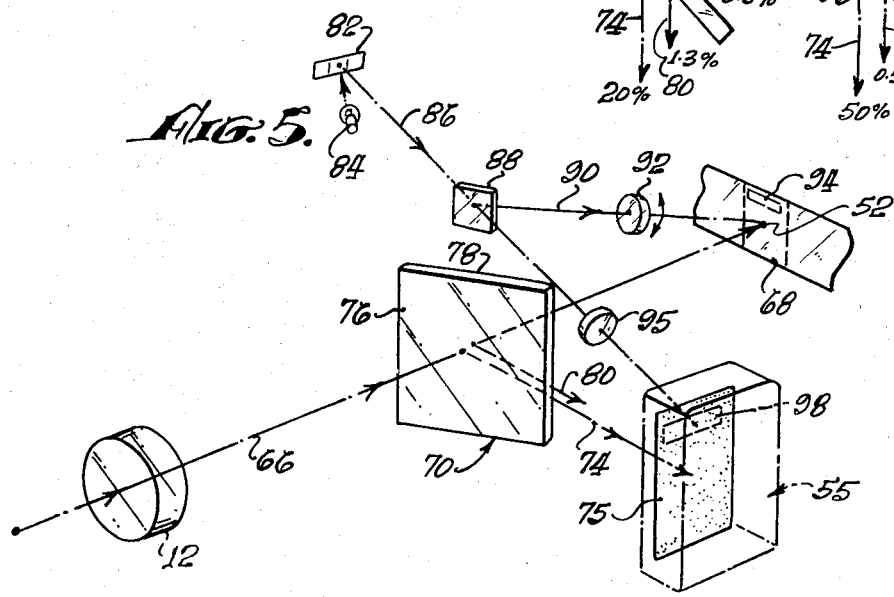
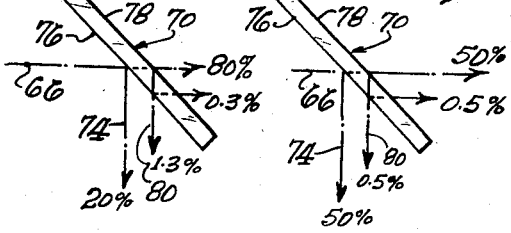
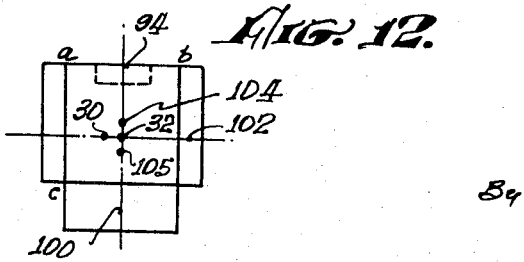

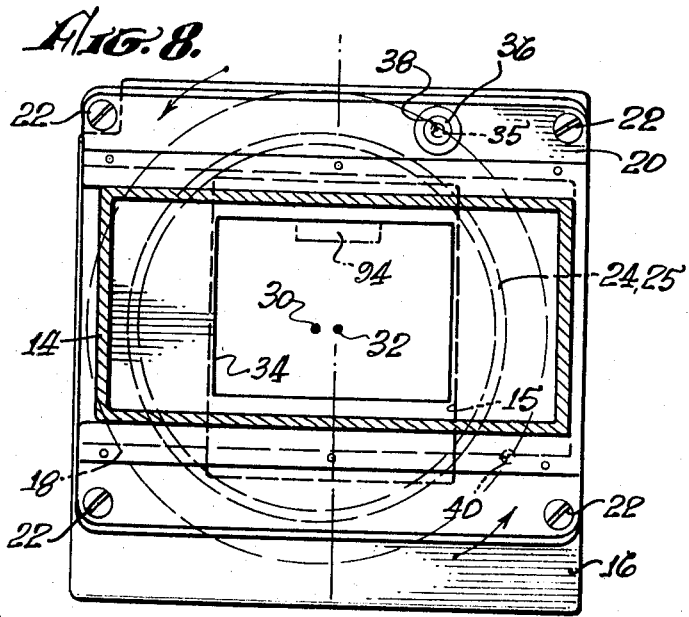
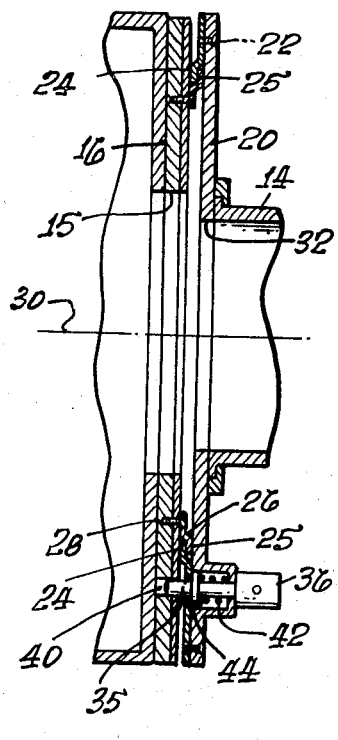
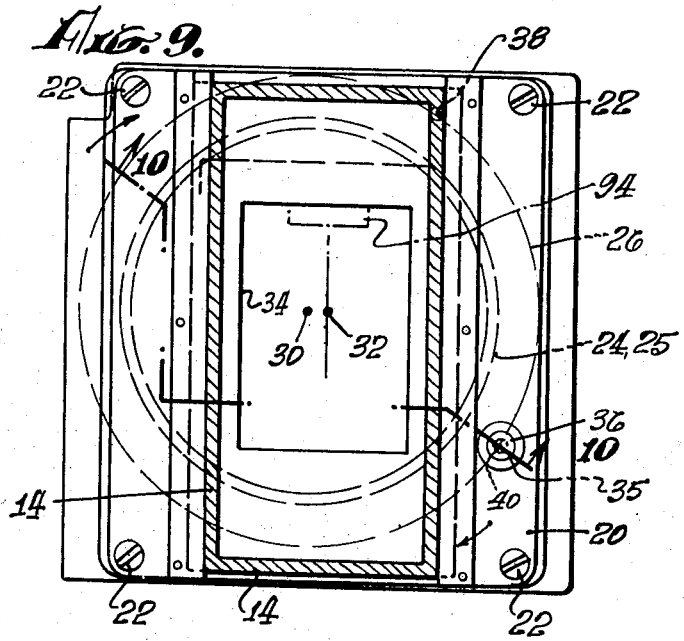
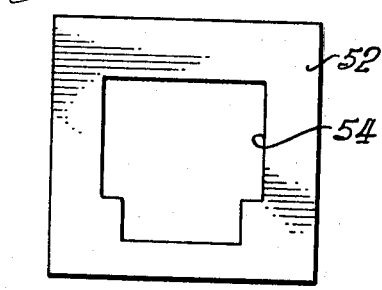
INVENTORS.
MARVIN A. REID,
WILLIAM R. SWIFT,
By Jess N Roberts
ATTORNEY.

DUAL CAMERA

BACKGROUND OF THE INVENTION

The usual procedure for photographing a subject in a photography studio is to expose several frames of negative film and after the film is developed to print proofs from the negatives to enable the customer to decide what negative frame is to be used. Such a procedure usually wastes film. For example, if the second of 10 consecutive exposures is the one that is selected by the subject, the remaining eight exposures are wholly unnecessary.

A more serious disadvantage of the usual procedure is the time involved in the necessity for the customer to make a return trip to inspect the proofs and, moreover, there is always the possibility of the customer losing interest during the delay.

The primary object of the invention is to eliminate both such time delay and the waste of film by producing immediately a proof of each exposure at the time the exposure is made. Thus the subject is enabled to approve or disapprove each exposure as soon as it is made.

Another object of the invention is to avoid creating an overlapping "ghost" image on the proof.

Still another object of the invention is to photograph data on each frame of the film and on each proof to correlate the proofs with the exposed frames of film.

A further object of the invention is to provide means for rotating an elongated film frame in the camera to permit the exposure on the negative film to be upright on a vertical film frame or to be upright on a horizontal film frame with the data system effective in both instances.

SUMMARY OF THE INVENTION

The camera has the usual removable film holder to expose successive frames of negative film, which holder may be a roll film magazine. It is contemplated that the negative film frame will be of the shape of an elongated rectangle and that the film holder will be rotatable to permit a choice between exposing a frame with its longitudinal axis vertical or exposing the frame with its longitudinal axis horizontal.

The camera is also provided with light-sensitive means capable of producing a positive image immediately after exposure, i.e., within 10 to 60 seconds. For this purpose the camera has a side opening equipped with a suitable holder for a removable "Polaroid" film pack.

For the purpose of the invention, a beam splitter is positioned inside the camera to intercept the beam of light that projects an image onto the negative film, the beam splitter reflecting a portion of the light beam onto the "Polaroid" film to project thereon a duplicate of the image. To avoid the creation of a ghost image on the "Polaroid" film, a beam splitter is employed that reflects at least 40 percent, and preferably 50 percent of the admitted light to the "Polaroid" film.

After each exposure the image on the "Polaroid" film is developed without delay to serve as a proof or duplicate of the image projected onto the negative film. A data system in the camera projects a second small light beam onto a minor portion of the negative film to produce a data image thereon and a second beam splitter intercepts the second beam to project a duplicate data image on the "Polaroid" film.

A mask is provided at the camera opening where the "Polaroid" film holder is mounted, the mask serving to close the opening in a lightproof manner to avoid fogging the the negative film when the "Polaroid" film holder is removed. The mask is retracted to clear the camera opening when a picture is taken. To make sure that the "Polaroid" film pack is not removed inadvertently while the mask is in its retracted position, the access door of the "Polaroid" film holder is secured by a latch mechanism and retraction of the mask prevents release of the latch mechanism.

As heretofore stated, the negative film holder or film magazine is rotatable through an angle of 90° to afford a choice between a vertically oriented frame or a horizontally oriented frame. It is not necessary to rotate the "Polaroid" film holder, however, because it serves only to produce a temporary duplicate of the image and therefore unnecessary complications are avoided by keeping the "Polaroid" film holder fixed against rotation.

A certain problem arises in that a data image must be projected onto a frame of the negative film regardless of whether the frame is vertically oriented or horizontally oriented and it would not be practical to introduce the complications that would be involved in rotating the data system whenever the negative film magazine is rotated. The problem is to project the data at a location on the film plane that will be satisfactory for both a vertically oriented film frame and a horizontally oriented film frame.

This problem is solved by so locating the center of rotation of the negative film holder as to cause a horizontal edge of the vertically oriented frame to coincide with a horizontal edge of the horizontally oriented frame. In the preferred embodiment of the invention the top edges of the two frames coincide when the two frames are superimposed on each other. By virtue of this arrangement there is a square area that is common to both frames and the data may be projected onto any suitable portion of this common area. Preferably the data is projected onto the upper margin of the common area to place the data adjacent the top edges of both frames.

A feature of the invention is the location of the center or rotation of the negative film holder. If the vertically oriented frame is superimposed on the horizontally oriented frame symmetrically thereof with the upper edges of the two frames coinciding, the geometrical centers of both frames will be on the longitudinal axis of the vertically oriented frame. In such an arrangement the center of rotation of the negative film holder is on a horizontal line that intersects the longitudinal axis of the vertically oriented frame at an intermediate point midway between the two geometrical centers. The axis of rotation may be located on this horizontal line either to the left or to the right of the longitudinal axis of the vertical frame. Usually, but not necessarily, the optical axis of the camera is at the intersection of the horizontal line with the longitudinal axis of the vertically oriented plane.

When the vertically and horizontally oriented frames are superimposed in the preferred manner as just described, the composite configuration is a T-shaped configuration. The preferred embodiment of the invention includes a view finder with a viewing frame of the same T-shaped configuration. The use of such a T-shaped viewing frame is made possible by eccentrically positioning the center of rotation of the negative film holder.

The various features and advantages of the invention may be understood from the following detailed description and the accompanying drawings.

BRIEF DESCRIPTION OF THE DRAWINGS

In the drawings, which are to be regarded as merely illustrative:

FIG. 1 is a perspective view of the presently preferred embodiment of the invention;

FIG. 2 is a fragmentary perspective view of the camera showing the mask for the "Polaroid" film in its retracted or open position;

FIG. 3 is a side elevation of the camera;

FIG. 4 is a top plan view of the camera with the upper wall of the camera removed to show the main beam splitter;

FIG. 5 is a perspective diagrammatic view showing the main optical system along with the data optical system;

FIG. 6 is a diagram representing a beam splitter that reflects 20 percent of the light;

FIG. 7 is a diagram representing a beam splitter that reflects 50 percent of the light;

FIG. 8 is a transverse section as seen along the line 8—8 of FIG. 3 with the negative film magazine rotated for horizontal orientation of the negative film frame;

FIG. 9 is a similar view with the negative film magazine rotated for vertical orientation of the negative film frame;

FIG. 10 is a section along the line 10—10 of FIG. 9 showing how the negative film magazine is rotatably mounted on the back of the camera;

FIG. 11 is a face view of the mask in the camera viewer showing how the mask is shaped with a viewing opening of T-shaped configuration; and FIG. 12 is a diagram to show the geometry involved in the location of the center of rotation of the negative film holder.

DESCRIPTION OF THE PREFERRED EMBODIMENT OF THE INVENTION

Referring first to FIGS. 1, 2 and 3, a camera, which may be a portrait camera mounted on a tripod 10, has a forward lens 12 and rearward negative film holder 14 which in this instance is in the form of a roll film magazine. The film in the holder 14 may be conveniently termed a first light-sensitive means. As shown in section in FIG. 8, the film magazine 14 is normally rotatably mounted across an opening 15 in the rear wall 16 of the camera. For this purpose a metal ring 18 attached to the mounting plate 20 of the film magazine by suitable screws 22 has a radially inward circular flange 24. The circular flange 24 slidingly engages a cooperating radially outward circular flange 25 of a metal ring 26 that is mounted on the rear wall 16 of the camera by suitable screws 28. As indicated in FIGS. 6 and 7, the cooperating circular flanges 24 and 25 are so located as to cause the film magazine 14 to rotate about an axis 30 that is spaced to one side of the optical axis 32 of the lens 12.

As also indicated in FIGS. 6 and 7 the negative film magazine 14 has an elongated rectangular frame opening 34 for exposure of the roll film, the frame opening being positioned with its longitudinal axis horizontal in FIG. 6 and being positioned with its longitudinal axis vertical in FIG. 7. FIG. 8 shows how a manually operable pin 35 having an external knob 36 is mounted on the mounting plate 20 of the film magazine to cooperate alternately with an upper bore 38 (FIG. 7) in the back camera wall and a similar lower bore 40 (FIG. 6), the two bores being positioned 90° apart relative to the axis of rotation 30. The pin 35 is biased inwardly by a suitable coil spring 42 that acts against a collar 44 on the pin so that the pin normally anchors the film magazine against rotation but may be readily manually retracted to permit rotation of the film magazine between its two alternate positions.

Referring to FIGS. 1 and 2, the camera is provided with a conventional view finder 45 that is of telescoped construction for extension and retraction, the forward section of the view finder being pivotally connected to the lens plate 46 of the camera by a hinge pin 48 and the rearward section of the view finder being pivotally connected to the body of the camera by a hinge pin 50. As indicated in FIG. 3, the view finder 45 incorporates a viewing mask 52, the viewing mask having a viewing opening 54 shown in FIG. 9, which opening is of T-shaped configuration.

A "Polaroid" film holder 55 having a hinged door 56 is normally positioned across a rectangular opening in the sidewall of the camera, the rectangular opening being indicated at 58 in FIG. 3. The "Polaroid" film may be termed the second light-sensitive means. When the "Polaroid" film holder 55 is mounted on the camera it is releasably secured by a well-known type of latch mechanism which includes an operating handle 60.

A suitable mask 62 having an end flange 64 to serve as a handle is slidable between a retracted open position shown in FIG. 2 and an alternate effective position shown in FIG. 1 at which it seals the rectangular opening 58 in a lightproof manner to permit the loading of new "Polaroid" film packs without admitting light to fog the negative film of the film magazine 14.

As shown in FIG. 2, the mask 62 has a corner notch 65 which must be registered with the handle 60 to permit the handle 60 to be rotated clockwise to unlatch the access door 56. When the mask 62 is retracted to open position as shown in FIG. 2, the mask blocks release rotation of the handle 60 but when the mask is in its alternate closed position shown in FIG. 1 the corner notch 65 provides clearance for release rotation of the latch handle 60.

In FIGS. 4 and 5 the line 66 represents the axis of the beam of light from the lens 12 that projects an image of the subject onto the negative film 68 in the film magazine 14. A beam splitter 70 of a well-known type is fixedly mounted inside the camera by brackets 72 in a position to intercept the beam of light and thus reflect a selected proportion of the beam along the lateral axis 74 to project a duplicate image of the subject onto the "Polaroid" film 75 in the film holder 55.

As indicated in FIG. 4, the beam splitter 70 has a forward partially silvered surface 76 which reflects the duplicate image along the lateral axis 74 and the beam splitter has the usual coated rear surface 78 which reflects an unwanted minor portion of the light along a lateral axis 80 that is slightly offset from the lateral axis 74. The forward surface 76 may be termed the primary reflecting surface and the surface 78 may be termed the secondary reflecting surface.

A nonreflective coating is used on the beam splitter to cause the amount of light that is reflected by the secondary reflecting surface 78 along the lateral axis 80 to the "Polaroid" film to be reduced to approximately 2 percent of the total light that is transmitted through the beam splitter to the negative film. The problem arises of preventing this 2 percent of light that is reflected by the secondary reflecting surface 78 onto the "Polaroid" film from creating a ghost image on the developed "Polaroid" film that will overlap the duplicate image created by the light that is reflected by the primary reflecting surface.

A beam splitter that reflects 20 percent of the total light to the "Polaroid" film and transmits 80 percent to the negative film would be logical but it has been found that when such a ratio is used conditions must be ideal if a ghost image on the "Polaroid" film is to be avoided. The exposure must be correct within narrow limits and the image cannot have too much contrast.

Surprisingly, however, it has been discovered that increasing the percentage of light that is reflected to the "Polaroid" film actually reduces the relative amount of light that tends to form a ghost image. The amount of light that is reflected onto the "Polaroid" film should be at least 40 percent and in the preferred practice of the invention it is 50 percent. With the higher ratio of light reflected to the "Polaroid" film, the exposure may be off and the image on the "Polaroid" film may be quite contrasty without creation of a troublesome ghost image.

In the diagram in FIG. 6 wherein the primary reflecting surface 76 of the beam splitter reflects only 20 percent of the light along the axis 74 onto the "Polaroid" film and 80 percent of the total light is transmitted through the primary reflecting surface, 2 percent of the 80 percent or 1.6 percent of the total light is reflected by the secondary reflecting surface 78 along the axis 80. As indicated, 20 percent of the 1.6 percent or 0.3 percent of the total light is harmlessly deflected by the secondary reflecting surface 78 towards the negative film and consequently 1.3 percent of the total light reaches the "Polaroid" film along the axis 80. The ratio between the 1.3 percent of the light that reaches the "Polaroid" film along the axis 80 and the 20 percent of the light that reaches the "Polaroid" film along the axis 74 is 0.065 and this ratio is so high that it is difficult to avoid a ghost image on the "Polaroid" film.

On the other hand, in FIG. 7 where 50 percent of the admitted light is reflected by the primary reflecting surface 76 of the beam splitter and 50 percent is transmitted through the primary reflecting surface, 2 percent of the 50 percent or 1.0 percent of the total light is reflected by the secondary reflecting surface 78 along the axis 80 and 50 percent of the 0.1 percent or 0.5 percent of the total light is harmlessly reflected by the primary reflecting surface 76 towards the negative film. Consequently only 0.5 percent of the total light reaches the "Polaroid" film along the axis 80. The ratio between the 0.5 percent of the light that reaches the "Polaroid" film along the axis 80 and the 50 percent that reaches "Polaroid" film along the axis 74 is only 0.010 (in contrast to the above ratio 0.065) and this ratio is so low that a ghost image is avoided even when the exposure is off.

Usually a neutral density filter is employed at the "Polaroid" film, such a filter being indicated by the dotted line 99 in FIG. 4. For example, with a 50/50 beam splitter, if ASA 100 color negative film and ASA 3000 "Polaroid" black-and-white film are employed, the correct neutral density filter is 0.80 N.D.

As indicated in FIG. 5, the data system of the camera includes a data indicator 82 illuminated by a lamp 84 that is shielded both from the negative film and from the "Polaroid" film. In a well-known manner the data indicator 82 displays a numeral which is changed automatically by the periodic advance of the roll film in the film magazine 14. The light from the data indicator 82 is directed along the axis 86 to a second beam splitter 88 that reflects a portion of the light along a lateral axis 90 through a lens 92 to project an image of the data on a small area of the roll film 68, the small area, which may be conveniently termed the first data area, being indicated diagrammatically by the broken line rectangle 94. The lens 92 is adjustable up and down to provide a data record on various sizes of negative film formats.

The portion of the data beam that is not reflected by the beam splitter continues along the axis 86 to pass through a second lens 95 to direct the data onto a second data area on the "Polaroid" film, the second data area being indicated by the broken line rectangle 98. Obviously the data optical system may be reversed to project the data beam onto the second data area with the beam splitter reflecting data onto the first data area. It has been found to be satisfactory to select a beam splitter 88 that reflects 50 percent of the light onto the negative film 68 and passes the remaining 50 percent onto the "Polaroid" film 75. The previously mentioned neutral density filter 99 at the "Polaroid" film balances the data light.

FIG. 10 shows diagrammatically how superimposing the horizontally oriented vertical frame 34 of FIG. 6 onto the vertical orientation of the frame shown in FIG. 7 results in a T-shaped composite configuration, the upper edges of the two orientations of the frame coinciding along the upper edge of the T-shaped configuration.

FIG. 10 also shows the spatial relationship between the axis of rotation 34 of the film magazine 14 and the optical axis 32 of the camera. The optical axis 32 is at an intermediate point on the longitudinal axis of the vertical frame where that longitudinal axis is intersected by the longitudinal axis 102 of the horizontal frame but, as heretofore indicated, the optical axis need not be precisely at this intermediate point.

The geometrical center 104 of the horizontally oriented frame is located on the vertical line 100 a given distance above the intermediate point 32 and the geometrical center 105 of the vertically oriented frame is on the same vertical line and is spaced below the intermediate point 32 by the same given distance. The axis of rotation 34 of the film magazine 14 is on the horizontal line 102 and is spaced from the intermediate point 32 by the same given distance. Thus the geometrical center 104 of the horizontal oriented frame, the geometrical center 105 of the vertically oriented frame and the axis of rotation 34 of the roll film magazine are all equidistant from the intermediate point 32 where the two longitudinal axes 104 and 105 intersect. In this instance the axis of rotation 34 is spaced leftward from the vertical line 100 but it may be spaced rightward from the vertical line by the same distance with no change in result.

It is apparent that the square area indicated by the letters a b c and d is common to both the vertically oriented frame and the horizontally oriented frame so that if the data is projected on any part of this area the data will appear on the negative film at both orientations of the film frame. In this instance the data image is projected on the portion of the square area that is indicated by the previously mentioned small rectangle 94, the small rectangle being centrally positioned adjacent the upper horizontal edge of the composite T-shaped configuration.

The T-shaped configuration of the opening 54 in the viewing mask 52 in FIG. 9 corresponds to the T-shaped configuration shown in FIG. 10. Thus the T-shaped configuration of the viewing mask opening 54 serves for both the vertical and horizontal orientations of the frame of the negative film.

The manner in which the camera serves its purpose may be readily understood from the foregoing description. Whenever an exposure is made on the negative film in the film magazine 14, a duplicate exposure is made on the "Polaroid" film in the "Polaroid" film holder 55. As soon as such an exposure is made on the negative film, the operator manipulates the "Polaroid" film holder 55 in a well-known manner to produce a positive duplicate of the image that remains latent on the negative film. If the positive duplicate image is not approved, additional exposures are made until a positive image is approved. Since the same data appears on the "Polaroid" film as on the negative film, the exposure on the negative film that corresponds to the selected "Polaroid" print may be readily identified.

Our description in specific detail of the presently preferred embodiment of the invention will suggest various changes, substitutions and other departures from our disclosure.

We claim:

1. In a camera wherein a beam of light projects an image of a subject onto a light-sensitive means for subsequent development, the improvement comprising:
   an opening in the wall of the camera;
   a holder for a second light-sensitive means capable of producing an immediate positive image;
   means to latch said holder to the camera in a position across said opening for exposure of the second light-sensitive means;
   a beam splitter intersecting the light beam to project a duplicate image onto the second light-sensitive means;
   a mask movable between a position to seal off said opening and a retracted position to permit projection of the duplicate image onto the second light-sensitive means; and
   means responsive to the position of the mask to prevent release of said latch means when the mask is in its retracted position.

2. In a camera wherein a light beam projects an image of a subject and the camera is provided with a first light-sensitive means for subsequent development of the image, the improvement comprising:
   an opening in the wall of the camera;
   a second light-sensitive means removably mounted across said opening and capable of producing an immediate positive image,
   one of said first and second light-sensitive means being positioned across said light beam to receive the image therefrom;
   a beam splitter in the camera intersecting the light beam to reflect a duplicate image onto the other of said first and second light-sensitive means;
   a holder for said first light-sensitive means having an elongated rectangular film-exposing frame opening,
   said holder being rotatable about an axis of rotation through an angle of 90° between a first position at which said frame opening is vertical to form a vertical frame for the film and a second position at which said frame opening is horizontal to form a horizontal frame for the film,
   said axis of rotation being located relative to said frame opening to cause said vertical and horizontal frames to form a composite configuration when one is superimposed on the other at the plane of the first light-sensitive means,
   said composite configuration having an area common to both the vertical frame and the horizontal frame,
   a portion of said common area being a first data area,
   said second light-sensitive means having a second data area;
   data means in the camera to direct a small beam of light onto one of said first and second data areas to project a data image thereon; and a second beam splitter intersecting said small beam to project a duplicate data image onto the other of said first and second data areas.

3. An improvement as set forth in claim 2 which includes a view finder on the camera having a viewing field of said composite configuration.

4. In a camera wherein a light beam projects an image on a subject and the camera is provided with a first light-sensitive means for subsequent development of the image, the improvement comprising:
   an opening in the wall of the camera;
   a second light-sensitive means removably mounted across said opening and capable of producing an immediate positive image,
   one of said first and second light-sensitive means being positioned across said light beam to receive the image therefrom;
   a beam splitter in the camera intersecting the light beam to reflect a duplicate image onto the other of said first and second light-sensitive means;
   a holder for said first light-sensitive means having an elongated rectangular film-exposing frame opening,
   said holder being rotatable about an axis of rotation through an angle of 90° between a first position at which said frame opening is vertical to form a vertical frame for the film and a second position at which said frame opening is horizontal to form a horizontal frame for the film,
   said axis of rotation being located relative to said frame opening to cause said vertical and horizontal frames to form a T-shaped configuration when one is superimposed on the other at the plane of the film,
   horizontal edges of the two frames substantially coinciding with the longest horizontal edge of the T-shaped configuration;
   the geometrical centers of the two frames being spaced apart on a vertical line that intersects the T-shaped configuration,
   a square area of the T-shaped configuration of the width of the vertical frame being common to both the vertical frame and the horizontal frame, said square area including a first relatively small data area,
   the axis of rotation of the film holder being spaced laterally of said vertical line;
   said second light-sensitive means having a second relatively small data area;
   data means in the camera to direct a small beam of light onto one of said first and second data areas to project a data image thereon; and
   a second beam splitter intersecting said small beam to project a duplicate data image onto the other of said first and second data areas.

5. An improvement as set forth in in claim 4 in which the beam splitter reflects the image onto the second light-sensitive means.

6. An improvement as set forth in claim 4 in which said first data area is adjacent said longest horizontal edge of the T-shaped configuration.

7. An improvement as set forth in claim 4 in which said axis of rotation is at equal distances from said two geometrical centers.

8. An improvement as set forth in claim 7 in which said axis of rotation and said two geometrical centers are all at equal distances from a point on said vertical line.

9. In a camera wherein a main beam of light projects and image of a subject onto a film for subsequent development, the improvement comprising:
   an opening in the wall of the camera;
   light-sensitive means removably mounted across said opening and capable of producing an immediate positive image;
   a beam splitter in the camera intersecting the light beam to project a duplicate image onto the light-sensitive means;
   a holder for said film having an elongated rectangular film-exposing frame opening,
   said holder being rotatable through an angle of 90° between a first position forming a vertical frame for the film and a second position forming a horizontal frame for the film,
   the geometrical centers of the two frames being spaced apart on a vertical line that intersects the T-shaped configuration,
   a square area of the T-shaped configuration of the width of the vertical frame being common to both the vertical frame and the horizontal frame,
   the center of rotation of the film holder being spaced laterally of said vertical line;
   data means in the camera to direct a small second beam light onto said square area of the T-shaped configuration to project a data image thereon adjacent said longest horizontal edge of the T-shaped configuration;
   a view finder on the camera having a viewing frame of a shape corresponding to said T-shaped configuration;
   an opening in the wall of the camera;
   a holder for light-sensitive means capable of producing a positive image immediately;
   means to latch said holder to the camera in a position across said opening;
   a mask movable between a position to seal off said opening and a retracted position to permit projection of the duplicate image onto the light-sensitive means; and
   means responsive to movement of the mask to prevent release of said latch means when the mask is in its retracted position.

10. An improvement as set forth in claim 1 in which the light-sensitive means has a given threshold of sensitivity;
   in which the beam splitter reflects a given portion of the light beam;
   the beam splitter having a main reflecting surface to reflect a major part of said portion of the light beam onto the light-sensitive means and having a secondary reflecting surface to reflect an unwanted phantom image onto the light-sensitive means slightly offset from the duplicate image,
   the reflectivity of the main surface determining said given portion and said secondary surface reflecting 2 percent of whatever the given portion may be,
   the reflectivity of said main reflecting surface being selected to make said given portion not more than 60 percent of the light beam thereby reducing the light reflected by the secondary reflecting surface to not more than 1.2 percent of the light beam to keep the light reflected from the secondary reflecting surface low enough relative to said threshold to substantially prevent development of said phantom image on the light-sensitive means without the necessity of employing filter means.

* * * * *